(12) United States Patent
Luo et al.

(10) Patent No.: US 9,906,322 B2
(45) Date of Patent: Feb. 27, 2018

(54) SYSTEM AND METHOD FOR PASSIVE OPTICAL NETWORK COMMUNICATION

(71) Applicant: Futurewei Technologies, Inc., Plano, TX (US)

(72) Inventors: Yuanqiu Luo, Cranbury, NJ (US); Frank J. Effenberger, Colts Neck, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 11 days.

(21) Appl. No.: 15/231,268

(22) Filed: Aug. 8, 2016

(65) Prior Publication Data
US 2016/0352451 A1 Dec. 1, 2016

Related U.S. Application Data

(63) Continuation of application No. 14/071,005, filed on Nov. 4, 2013, now Pat. No. 9,413,484.

(51) Int. Cl.
*H04J 14/02* (2006.01)
*H04B 10/27* (2013.01)
(Continued)

(52) U.S. Cl.
CPC .......... *H04J 14/0235* (2013.01); *H04B 10/27* (2013.01); *H04J 14/0227* (2013.01);
(Continued)

(58) Field of Classification Search
None
See application file for complete search history.

(56) References Cited

U.S. PATENT DOCUMENTS

2007/0064731 A1   3/2007 Mizutani et al.
2008/0205443 A1*  8/2008 Shi .................. H04Q 11/0067
                                                      370/468
(Continued)

FOREIGN PATENT DOCUMENTS

WO   2011072578 A1   6/2011

OTHER PUBLICATIONS

International Telecommunication Union, Telecommunication Standardization Sector of ITU, "10-Gigabit-Capable Passive Optical Networks (XG-PON): Transmission Convergence (TC) Layer Specification," Series G: Transmission Systems and Media, Digital Systems and Networks, Digital sections and digital line system—Optical line systems for local and access networks, Recommendation ITU-T G.987.3, Oct. 2010, 134 pages.

(Continued)

*Primary Examiner* — Darren E Wolf
(74) *Attorney, Agent, or Firm* — Slater Matsil, LLP

(57) ABSTRACT

In one embodiment, a method for passive optical network (PON) communication includes broadcasting, by an optical line terminal (OLT), a first message including a first start time of a first quiet window and a first allocation identification number (Alloc-ID), where the first Alloc-ID indicates a first supported upstream line rate associated with the first quiet window. The method also includes receiving, by the OLT from a first optical network unit (ONU) during the first quiet window, a first serial number response, wherein a first transmitting upstream line rate of the first ONU is equal to the first supported upstream line rate.

20 Claims, 5 Drawing Sheets

Related U.S. Application Data

(60) Provisional application No. 61/722,460, filed on Nov. 5, 2012.

(51) Int. Cl.

| | | |
|---|---|---|
| *H04Q 11/00* | (2006.01) | |
| *H04B 10/25* | (2013.01) | |
| *H04B 10/50* | (2013.01) | |
| *H04B 10/60* | (2013.01) | |

(52) U.S. Cl.
CPC ......... *H04Q 11/0067* (2013.01); *H04B 10/25* (2013.01); *H04B 10/50* (2013.01); *H04B 10/60* (2013.01); *H04J 14/026* (2013.01); *H04J 14/0232* (2013.01); *H04J 14/0247* (2013.01); *H04J 14/0252* (2013.01); *H04J 14/0267* (2013.01); *H04J 14/0298* (2013.01); *H04Q 2011/0086* (2013.01); *H04Q 2011/0096* (2013.01)

(56) References Cited

U.S. PATENT DOCUMENTS

| | | |
|---|---|---|
| 2009/0263132 A1 | 10/2009 | Rafel et al. |
| 2010/0027561 A1* | 2/2010 | Greborio ............ H04Q 11/0067 370/468 |
| 2010/0226649 A1 | 9/2010 | Cheng et al. |
| 2012/0148247 A1* | 6/2012 | Skubic ................... H04L 47/10 398/58 |
| 2012/0230693 A1 | 9/2012 | Zou |

OTHER PUBLICATIONS

International Telecommunication Union, Telecommunication Standardization Sector of ITU "Gigabit-capable passive optical Networks (G-PON): Transmission convergence layer specification," Series G: Transmission Systems and Media, Digital Systems and Networks, Digital sections and digital line system—Optical line systems for local and access networks, Recommendation ITU-T G.984.3, Jan. 2014, 170 pgs.

Mandin, J., "10G Broadcast in a Coexistence-enabled PON," IEEE 802.3av, San Francisco, California, Jul. 2007, 8 pgs.

* cited by examiner

SYSTEM AND METHOD FOR PASSIVE OPTICAL NETWORK COMMUNICATION

CROSS-REFERENCE TO RELATED APPLICATIONS

This application claims is a continuation of U.S. application Ser. No. 14/071,005, filed on Nov. 4, 2013, which claims the benefit of U.S. Provisional Application Ser. No. 61/722,460 filed on Nov. 5, 2012, which applications are hereby incorporated herein by reference.

TECHNICAL FIELD

The present invention relates to a system and method for optical communications, and, in particular, to a system and method for passive optical network communication.

BACKGROUND

A passive optical network (PON) is a point-to-multipoint, fiber to the premises fiber-optic access network architecture in which unpowered optical splitters are used to facilitate a single optical fiber to serve multiple premises. For example, a single optical fiber may serve 16-128 premises. A PON may reduce the amount of optical fiber and central office equipment compared to point-to-point architectures. A PON may include an optical line terminal (OLT) at the service provider's central office and a number of optical network units (ONUs) near end users. Downstream signals are broadcast to the premises sharing multiple fibers with encryption to prevent eavesdropping.

A PON uses wavelength division multiplexing (WDM), using one wavelength, for example 1490 nm, for downstream traffic and another wavelength, for example 1310 nm, for upstream traffic. A 1550 nm wavelength is used for optional overlay services, for example radio frequency (RF) analog video.

SUMMARY

An embodiment method for passive optical network (PON) communication includes broadcasting, by an optical line terminal (OLT), a first message including a first start time of a first quiet window and a first allocation identification number (Alloc-ID), where the first Alloc-ID indicates a first supported upstream line rate associated with the first quiet window. The method also includes receiving, by the OLT from a first optical network unit (ONU) during the first quiet window, a first serial number response, wherein a first transmitting upstream line rate of the first ONU is equal to the first supported upstream line rate.

Another embodiment method for passive optical network (PON) communication includes receiving, by an optical network unit (ONU) from an optical line terminal (OLT), a first message including a first start time of a first quiet window and a first allocation identification number (Alloc-ID), where the first Alloc-ID indicates a first supported upstream line rate associated with the first quiet window. The method also includes when a transmitting upstream line rate of the ONU is equal to the first supported upstream line rate, transmitting, by the ONU to the OLT during the first quiet window, a first serial number response and when the transmitting upstream line rate of the ONU is not equal to the first supported upstream line rate, not transmitting, by the ONU to the OLT during the first quiet window.

An embodiment optical line terminal (OLT) includes a processor and a computer readable storage medium storing programming for execution by the processor, the programming including instructions to broadcast a first message including a first start time of a first quiet window, and a first allocation identification number (Alloc-ID), where the first Alloc-ID indicates a first supported upstream line rate associated with the first quiet window. The programming also includes instructions to receive, from an optical network unit (ONU) during the first quiet window, a first serial number response, where a transmitting upstream line rate of the ONU is equal to the first supported upstream line rate.

An embodiment optical network unit (ONU) includes a processor and a computer readable storage medium storing programming for execution by the processor, the programming including instructions to receive, from an optical line terminal (OLT), a first message including a first start time of a first quiet window and a first allocation identification number (Alloc-ID), where the first Alloc-ID indicates a first supported upstream line rate associated with the first quiet window. The programming also includes instructions to, when a transmitting upstream line rate of the first ONU is equal to the first supported upstream line rate, transmit, to the OLT during the first quiet window, a first serial number response, and when the transmitting upstream line rate of the ONU is not equal to the first supported upstream line rate, not transmit, by the ONU to the OLT during the first quiet window.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless other-

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Passive optical networks (PONs), such as a gigabit PON (G-PON) and a 10 gigabit PON (XG-PON), are point-to-multipoint optical networks. In an example, G-PON supports 1.25 G upstream lines, while XG-PON supports 2.5 G upstream lines. Dynamic bandwidth allocation (DBA) may be used to support a higher bandwidth for G-PON and XG-PON.

An example PON supports different upstream line rates for different optical network units (ONUs). An optical line terminal (OLT) opens up different quiet windows for different upstream line rates. Then, ONUs respond during the appropriate quiet window for their upstream line rate.

Figure 1:
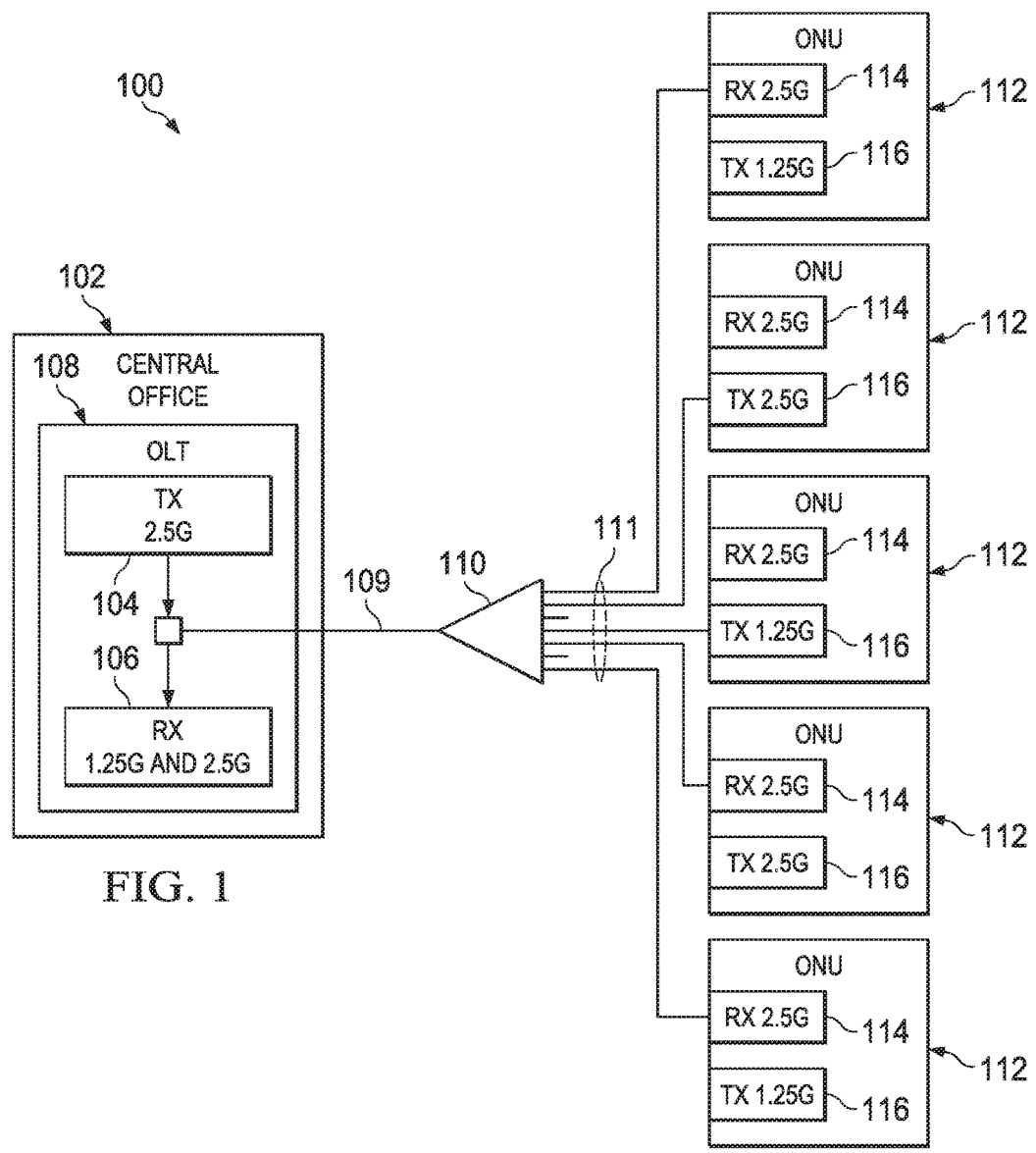
FIG. 1 illustrates a diagram of an embodiment passive optical network (PON) for communicating data.

FIG. 1 illustrates G-PON 100, which may be operated at a variable upstream line rate. For example, G-PON 100 supports upstream line rates of 1.25 G and 2.5 G. Central office 102 contains OLT 108, which is coupled to ONUs 112. Five ONUs are pictured, but fewer or more ONUs may be used. OLT 108 contains transmitter 104 and receiver 106. Transmitter 104 transmits data at 2.5 G, while receiver 106 receives data at 1.25 G and 2.5 G. Fiber 109 couples OLT 108 to splitter 110. Then, fibers in fan out from splitter no to ONUs 112, with one fiber connecting an ONU to splitter 110. ONUs 112 contain receivers 114 and transmitters 116. Receivers 114 receive data at 2.5 G, while transmitters 116 transmit at various rates. Some transmitters 116 transmit data at 1.25 G, while other transmitters 116 transmit data at 2.5 G.

Figure 2:
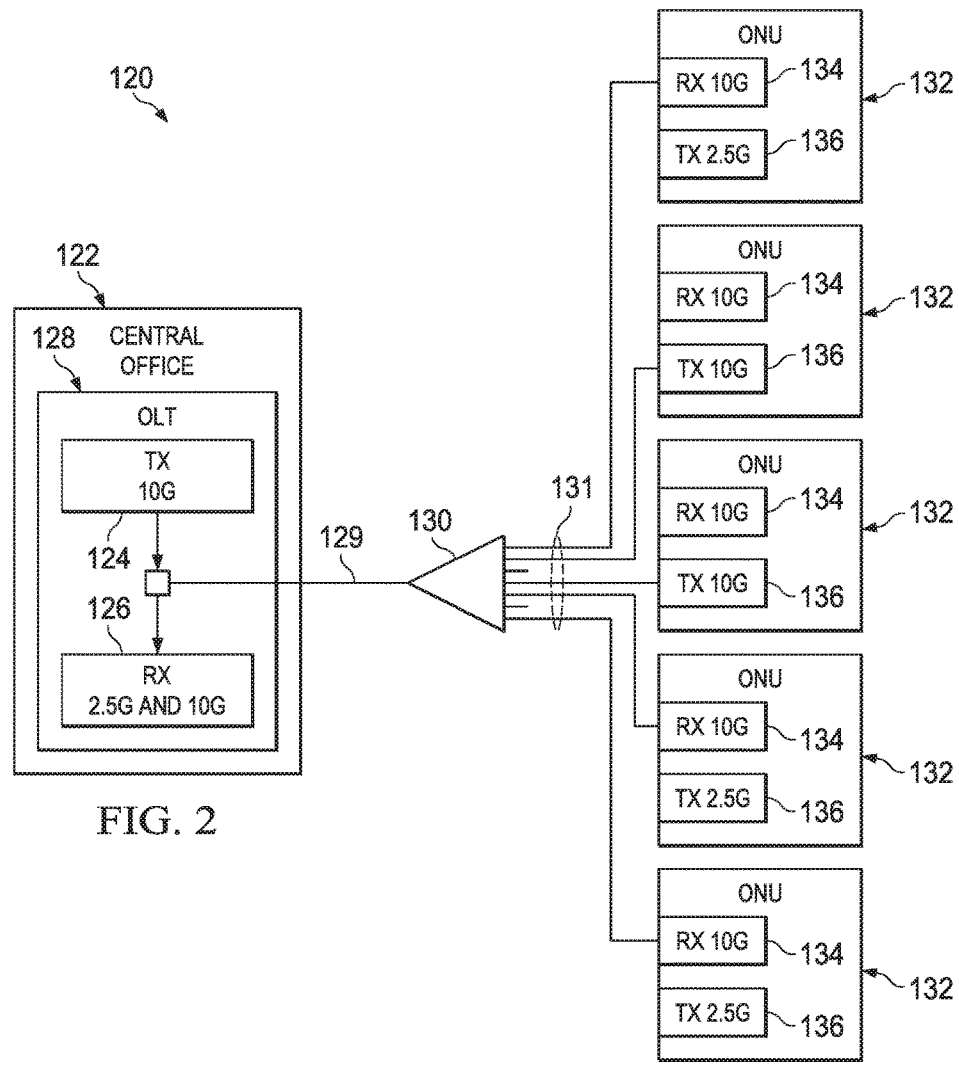
FIG. 2 illustrates a diagram of another embodiment PON for communicating data.

FIG. 2 illustrates XG-PON 120, which operates at a variable upstream line rate. For example, XG-PON 120 supports ONUs with upstream line rates of 2.5 G and 10 G. Central office 122 contains OLT 128, which is coupled to ONUs 132. OLT 128 contains transmitter 124, which transmits at 10 G and receiver 126, which receives data at 2.5 G and 10 G. Fiber 129 couples OLT 128 to splitter 130. Splitter 130 is coupled to ONUs 132 by fibers 131, which fan out from splitter 1030. ONUs 132 contain receivers 134 and transmitters 136. Receivers 134 receive data at 10 G, while transmitters 136 transmit data at 2.5 G or 10 G. In an example, the 10 G upstream channel is used for business customers, while the 2.5 G upstream channel is used by residential customers.

An embodiment supports multiple upstream rates in G-PON and XG-PON by enhancing the PON operation, administration, and maintenance (OAM) channel to provide different ranging grants to new ONUs with different upstream rates. The OLT opens separate quiet windows for ONUs with different upstream rates by broadcasting different serial number grants/requests. This enhancement of the ONU activation process facilitates the OLT to identify the ONU upstream rates and group ONUs based on upstream rate.

Figure 3:
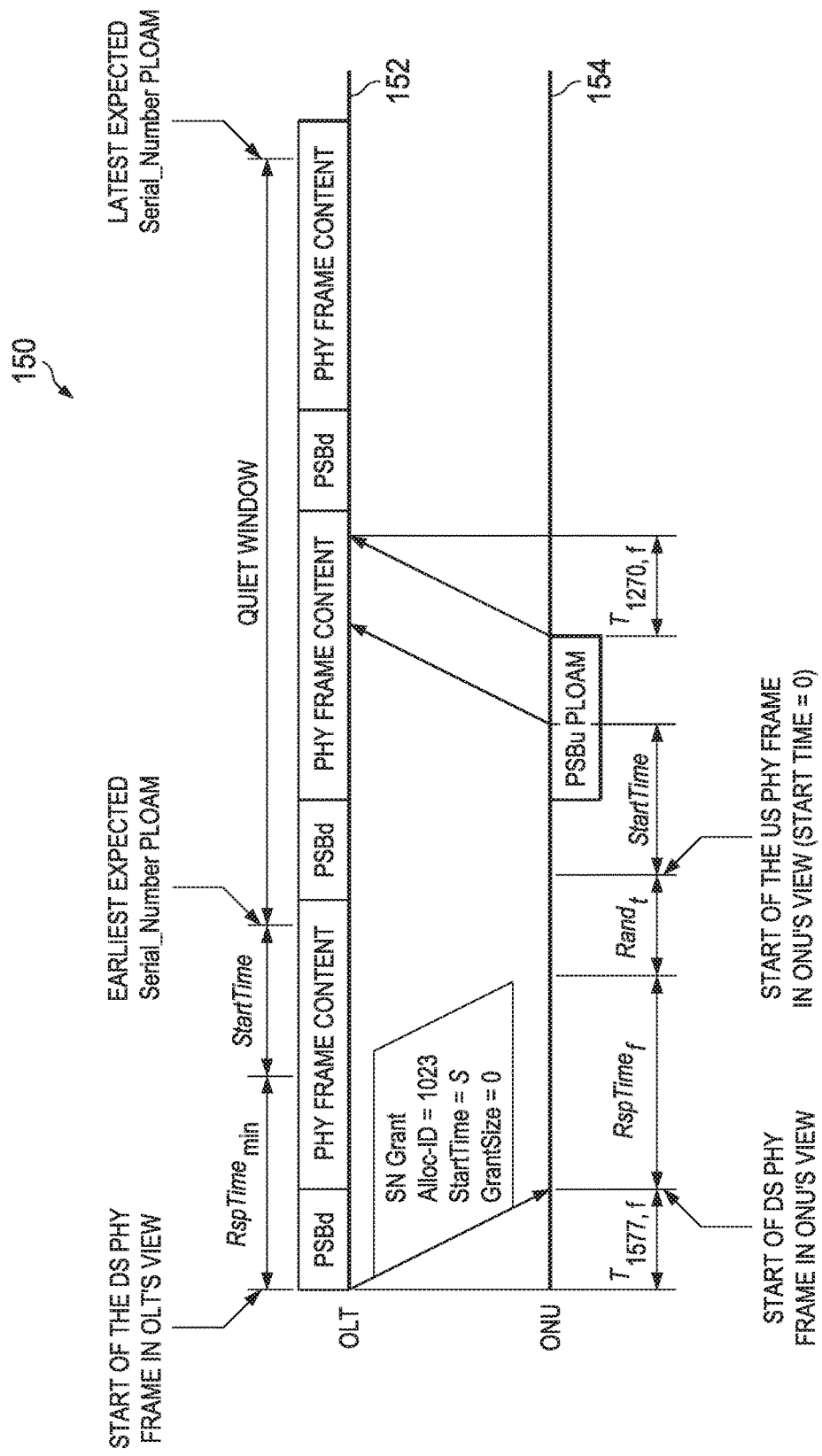
FIG. 3 illustrates a diagram of an embodiment message stream between an optical line terminal (OLT) and an optical network unit (ONU)

FIG. 3 illustrates message diagram 150 for messages exchanged between OLT 152 and ONU 154 during the activation procedure. During activation, an inactive ONU joins or resumes operation on the PON. Initially, OLT 152 broadcasts a downstream (DS) physical layer (PHY) frame containing a physical synchronization block appropriation for downstream (PSBd) and a PHY frame content. The PSBd contains a serial number (SN) grant message. The SN Grant message contains an allocation identification number (Alloc-ID), a start size, and a grant size. Alloc-ID is a logical ID. In message diagram 150, Alloc-ID is 1023, the start time is S, and the grant size is 0. ONU 154 receives the SN Grant message.

At the start time S, the OLT opens a quiet window. During the quiet window, ONUs already registered with OLT 152 do not communicate with OLT 152. Also, during the quiet window, ONU 154 transmits a serial number response containing an upstream (US) PHY frame having a physical synchronization block appropriation for upstream (PSBu) and a physical layer operation, administration, and maintenance (PLOAM). During the quiet window, multiple ONUs may associate with the PON.

In an embodiment, there are multiple quiet windows, where each quiet window is for ONUs with a particular upstream line rate to use. The Alloc-ID indicates the upstream line rate for a given quiet window. Then, only ONUs with the designated upstream line rate associate during the quiet window. Table 1 below illustrates embodiment G-PON Alloc-ID values. The G-PON Alloc-ID is 12 bits. Some of the Alloc-IDs are used to represent serial number grants for ONUs with an upstream rate different from 1.25 G. Alloc-IDs from 0 to 251 are default Alloc-IDs, implicitly assigned with, and equal to the ONU identification number (ID). An Alloc-ID of 252, which is broadcast, is used by the OLT in a serial number grant allocation structure to indicate that any ONU with any upstream line rate executing the serial number acquisition phase of the activation procedure may use this allocation to transmit a serial number response. On the other hand, an Alloc-ID 253, which is broadcast, is used by an OLT in a serial number grant allocation structure to indicate that any ONU with a 2.5 G upstream rate executing the serial number acquisition phase of the activation procedure may use this allocation to transmit a serial number response. An Alloc-ID of 254, which is broadcast, is used by the OLT in a serial number grant allocation structure to indicate that any ONU with a 1.25 G upstream rate executing the serial number acquisition phase of the activation procedure may use this allocation to transmit a serial number response. Alloc-ID 255 is unassigned, and Alloc-IDs 256 to 4095 are assignable. When more than a single Alloc-ID is needed for an ONU, the OLT assigns additional Alloc-IDs to that ONU by selecting a unique number from this range.

TABLE 1

| Alloc-ID | Designation | Comment |
|---|---|---|
| 0 . . . 251 | Default | Default Alloc-ID, which is implicitly assigned with and is equal to the ONU-ID. |
| 252 | Broadcast | Used by OLT in a serial number grant allocation structure to indicate that any ONU supporting either 1.25 G or 2.5 G upstream line rate which executes the serial number acquisition phase of the activation procedure may use this allocation to transmit a serial number response. |
| 253 | Broadcast | Used by OLT in a serial number grant allocation structure to indicate that any ONU supporting a 2.5 G upstream line rate which executes the serial number acquisition phase of the activation procedure may use this allocation to transmit a serial number response. |
| 254 | Broadcast | Used by OLT in a serial number grant allocation structure to indicate that any ONU supporting a 1.25 G upstream line rate which executes the serial number acquisition phase of the activation procedure may use this allocation to transmit a serial number response. |
| 255 | unassigned | |
| 256 . . . 4095 | Assignable | If more than a single Alloc-ID is needed for an ONU, the OLT assigns additional Alloc-IDs to that ONU by selecting a unique number from this range. |

The quiet windows for different types of ONUs are scheduled in separate timeslots, so that, as soon as the OLT receives a serial number ONU PLOAM, the transmitting upstream line rate of the ONU can be immediately identified. For example, a quiet window with an Alloc-ID of 252 indicates an ONU with an upstream rate of either 1.25 G or 2.5 G may register during the given quiet window, an Alloc-ID of 253 indicates an ONU with an upstream rate of 2.5 G may register during the given quiet window, and an Alloc-ID of 254 indicates an ONU with an upstream rate of 1.25 G may register during the given quiet window.

Table 2 below indicates an example of Alloc-ID values for XG-PON. Alloc-IDs of 0 to 1020 are default Alloc-IDs that are implicitly assigned with and equal to the ONU-ID. Alloc-IDs of 1021, 1022, and 1023 are broadcast. An Alloc-ID of 1021 is used by an OLT in a serial number grant allocation structure to indicate that any upstream rate executing the serial number acquisition phase of the activation procedure may use this allocation to transmit a serial number response. On the other hand, an Alloc-ID of 1022 is used by an OLT in a serial number grant allocation structure to indicate that any ONU with a 10 G upstream rate executing the serial number acquisition phase of the activation procedure may use this allocation to transmit a serial number response. An Alloc-ID of 1023 is used by an OLT in a serial number grant allocation structure to indicate that any ONU with a 2.5 G upstream rate executing the serial number acquisition phase of the activation procedure may use this allocation to transmit a serial number response. Alloc-IDs of 1024 to 16383 are assignable. If more than a single Alloc-ID is needed for an ONU, the OLT assigns additional Alloc-IDs to that ONU by selecting a unique number from this range and communicating it to the ONU using the Assign_Alloc-ID PLOAM message.

TABLE 2

| Alloc-ID | Designation | Comment |
|---|---|---|
| 0 . . . 1020 | Default | Default Alloc-ID, which is implicitly assigned with and is equal to the ONU-ID. |
| 1021 | Broadcast | Used by OLT in a serial number grant allocation structure to indicate that any ONU supporting either 10 G or 2.5 G any upstream line rate which execute the serial number acquisition phase of the activation procedure may use this allocation to transmit a serial number response. |
| 1022 | Broadcast | Used by OLT in a serial number grant allocation structure to indicate that any ONU supporting 10 G upstream line rate which execute the serial number acquisition phase of the activation procedure may use this allocation to transmit a serial number response. |
| 1023 | Broadcast | Used by OLT in a serial number grant allocation structure to indicate that any ONU supporting a 2.5 G upstream line rate which execute the serial number acquisition phase of the activation procedure may use this allocation to transmit a serial number response. |
| 1024 . . . 16383 | Assignable | If more than a single Alloc-ID is needed for an ONU, the OLT assigns additional Alloc-IDs to that ONU by selecting a unique number from this range and communicating it to the ONU using the Assign_Alloc-ID PLOAM message. |

Figure 4:
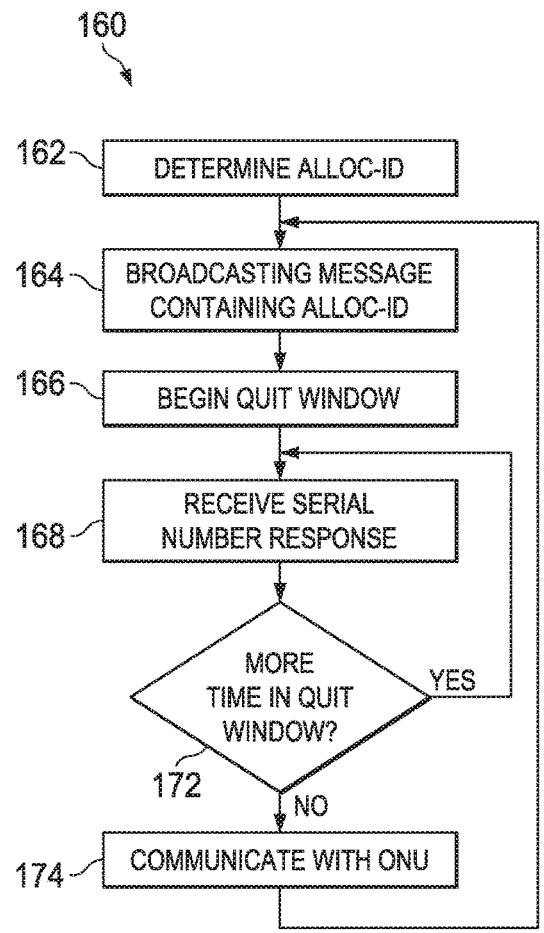
FIG. 4 illustrates a flowchart of an embodiment method for activating ONUs performed by an OLT.

FIG. 4 illustrates flowchart 160 for an embodiment method of activating ONUs with different upstream line rates performed by an OLT. Initially, in step 162, the OLT determines the Alloc-ID for a quiet window. The Alloc-ID indicates the upstream line rate of the ONUs that activate during the quiet window. For example, in a G-PON, an Alloc-ID of 252 indicates that any ONU may associate in the quiet window, an Alloc-ID of 253 indicates that ONUs with upstream line rates of 2.5 G may respond in this quiet window, and an Alloc-ID of 254 indicates that ONUs with upstream line rates of 1.25 G may respond in this quiet window. In another example, in an XG-PON, an Alloc-ID of 1021 indicates than any ONU may respond during this quiet window, an Alloc-ID of 1022 indicates that ONUs with upstream line rates of 10 G may respond during this quiet window, and an Alloc-ID of 1023 indicates that ONUs with upstream line rates of 2.5 G may respond during this quiet window.

Next, in step 164, the OLT broadcasts a message containing the Alloc-ID determined in step 162 to multiple ONUs. In an example, the message contains a PSBd and a PHY frame content. The PSBd contains an SN Grant containing the Alloc-ID, the start time, and the grant size.

After broadcasting the message, the OLT begins the quiet window the start time contained in the message in step 166. During the quiet window, the OLT listens for messages from ONUs trying to associate with the PON. During the quiet window, only ONUs with upstream line rates indicated by Alloc-ID respond. Thus, the OLT knows the upstream line rate of ONUs that associate during this quiet window.

In step 168, the OLT receives a serial number response from an ONU seeking to activate. The OLT knows the upstream line rate of the ONU based on the quiet window that the ONU uses. The serial number response may contain a PSBu and a PLOAM.

Then, in step 172, the OLT determines whether there is more time in this quiet window. When there is time remaining in the quiet window, the OLT listens for more messages for ONUs. When it receives a message, it proceeds to step 168. When the quiet window expires, the OLT proceeds to step 174. In step 174, the ONU is associated with the PON, and the ONU and OLT privately communicate. The OLT transmits messages to the ONU and receives messages from the ONU.

This procedure may be performed for a new quiet window. The new quiet window may have the same upstream line rate or a different upstream line rate.

Figure 5:
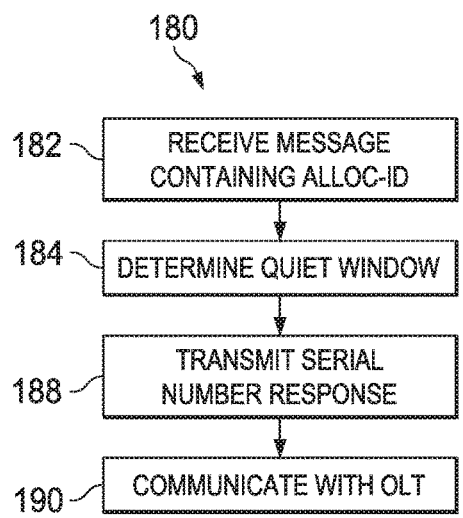
FIG. 5 illustrates a flowchart of an embodiment method for activating ONUs performed by an ONU.

FIG. 5 illustrates flowchart 180 for a method of activating ONUs performed by an ONU. Initially, in step 182, the ONU receives a message containing an Alloc-ID. For example, the message contains a PSBd and a PHY frame content, and the PSBd contains an SN grant. The SN grant contains an Alloc-ID, a start time, and a grant size. The Alloc-ID indicates the upstream line rates of ONUs that may respond during the quiet window, and the start time indicates the start time of the quiet window. For example, in a G-PON, an Alloc-ID of 252 indicates that any ONU may respond in the quiet window, an Alloc-ID of 253 indicates that ONUs with upstream rates of 2.5 G may respond in this quiet window, and an Alloc-ID of 254 indicates that ONUs with upstream rates of 1.25 G may respond in this quiet window. In another example, in an XG-PON, an Alloc-ID of 1021 indicates than any ONU may associate in this quiet window, an Alloc-ID of 1022 indicates that ONUs with upstream line rates of 10 G may respond in this quiet window, and an Alloc-ID of 1023 indicates that ONUs with upstream line rates of 2.5 G may respond in this quiet window.

The ONU will only use the quiet window when the ONU has an upstream line rate compatible with the upstream line rate indicated by the Alloc-ID received in step 182. The ONU determines whether the quiet window has an upstream line rate that is the same as the ONU's upstream line rate. If the upstream line rate of the quiet window is the same as that of the ONU, the ONU determines the start time of the quiet window from the message received in step 182.

During the quiet window for which the ONU has the appropriate upstream line rate, in step 188, the ONU transmits a serial number response to the OLT containing a PSBu and a PLOAM to associate with the PON.

Finally, in step 190, the ONU is associated with the PON. The ONU and the OLT communicate privately. The ONU transmits messages to the ONU and receives messages from the OLT.

Figure 6:
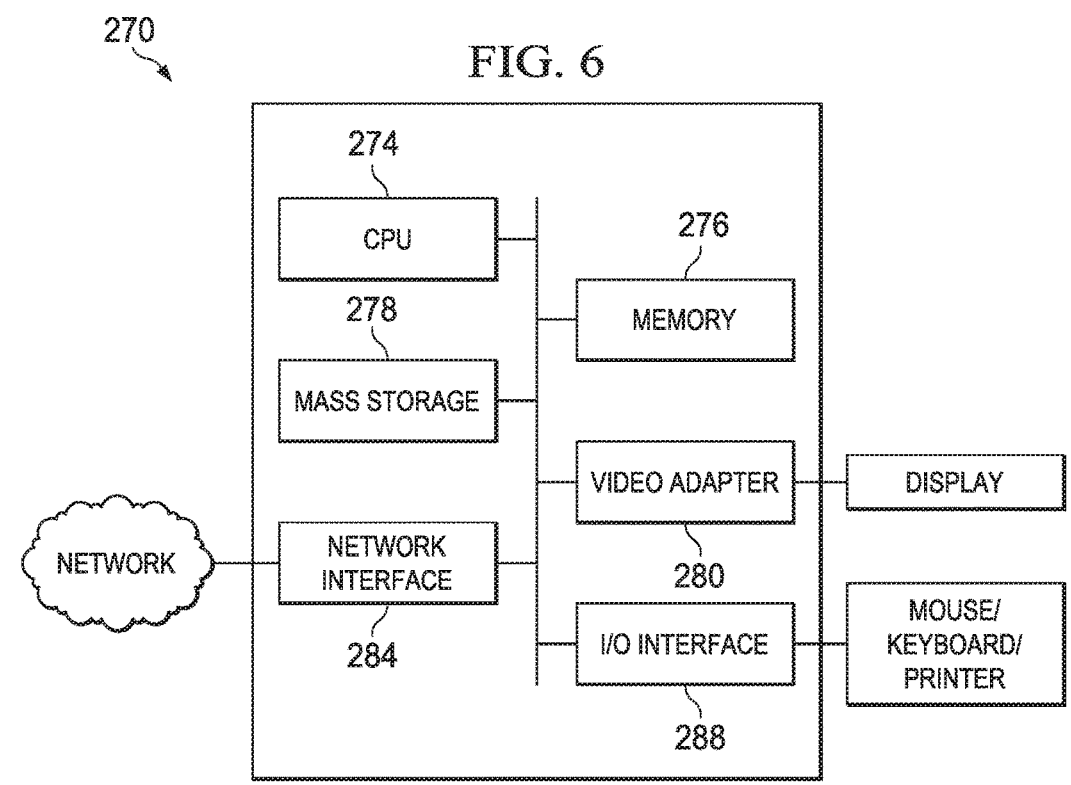
FIG. 6 illustrates a block diagram of an embodiment general-purpose computer system.

FIG. 6 illustrates a block diagram of processing system 270 that may be used for implementing the devices and methods disclosed herein, such as by providing data to or from an OLT or ONU. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, such as the interface to the OLT or ONU, and others of which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
   broadcasting, by an optical line terminal (OLT) to a plurality of optical network units (ONUs), a first downstream (DS) physical layer (PHY) frame comprising:
      a first start time for a first quiet window; and
      a first allocation identifier (Alloc-ID), wherein the first Alloc-ID indicates that ONUs of a first group of ONUs transmitting at a first supported upstream line rate may use the first quiet window and that ONUs of a second group of ONUs not transmitting at the first supported upstream line rate may not use the first quiet window, and wherein the ONUs of the second group of ONUs configured to transmit at a second supported upstream line rate;
   opening the first quiet window at the first start time; and
   receiving, from a first ONU of the first group of ONUs, during the first quiet window, a serial number response.

2. The method of claim 1, further comprising broadcasting, by the OLT to the plurality of ONUs, a second DS PHY frame comprising:
   a second start time for a second quiet window; and
   a second Alloc-ID, wherein the second Alloc-ID indicates that ONUs of the second group of ONUs may use the second quiet window and that ONUs of the first group of ONUs may not use the second quiet window.

3. The method of claim 2, wherein the first Alloc-ID is 1022 and the second Alloc-ID is 1023.

4. The method of claim 1, further comprising broadcasting, by the OLT to the plurality of ONUs, a second DS PHY frame comprising:
   a second start time for a second quiet window; and
   a second Alloc-ID, wherein the second Alloc-ID indicates that ONUs of the second group of ONUs may use the second quiet window and that ONUs of the first group of ONUs may use the second quiet window.

5. The method of claim 4, wherein the second Alloc-ID is 1021.

6. The method of claim 1, further comprising refraining from communicating, during the first quiet window, with a third group of ONUs already registered to the OLT.

7. The method of claim 1, wherein the first supported upstream line rate is 2.5 G and the second supported upstream line rate is 10 G.

8. The method of claim 1, wherein the first supported upstream line rate is 1.25 G and the second supported upstream line rate is 2.5 G.

9. The method of claim 1, further comprising:
   associating the first ONU with a passive optical network (PON) of the OLT after receiving the serial number response; and
   privately communicating, by the OLT with the first ONU, after associating the first ONU with the PON.

10. A method comprising:
    receiving, by an optical network unit (ONU) from an optical line terminal (OLT), a first downstream (DS) physical layer (PHY) frame comprising:
       a first start time for a first quiet window; and
       a first allocation identifier (Alloc-ID), wherein the first Alloc-ID indicates that ONUs of a first group of ONUs transmitting at a first supported upstream line rate may use the first quiet window and that ONUs of a second group of ONUs not transmitting at the first supported upstream line rate may not use the first quiet window, and wherein the ONUs of the second group of ONUs configured to transmit at a second supported upstream line rate;
    determining whether an upstream line rate of the ONU is the same as the first supported upstream line rate;
    transmitting, by the ONU to the OLT, during the first quiet window, a serial number response upon determining that the upstream line rate of the ONU is the same as the first supported upstream line rate; and
    refraining from transmitting, by the ONU to the OLT, during the first quiet window, upon determining that the upstream line rate of the ONU is different than the first supported upstream line rate.

11. The method of claim 10, further receiving, by the ONU from the OLT, a second DS PHY frame comprising:
    a second start time for a second quiet window; and
    a second Alloc-ID, wherein the second Alloc-ID indicates that ONUs of the second group of ONUs may use the second quiet window and that ONUs of the first group of ONUs may not use the second quiet window.

12. The method of claim 11, wherein the first Alloc-ID is 1022 and the second Alloc-ID is 1023.

13. The method of claim 10, further comprising receiving, by the ONU from the OLT, a second DS PHY frame comprising:
    a second start time for a second quiet window; and
    a second Alloc-ID, wherein the second Alloc-ID indicates that ONUs of the second group of ONUs may use the second quiet window and that ONUs of the first group of ONUs may use the second quiet window.

14. The method of claim 13, wherein the second Alloc-ID is 1021.

15. The method of claim 10, further comprising:
    determining whether the ONU is already registered to a passive optical network (PON) of the OLT; and
    not transmitting, by the ONU to the OLT, during the first quiet window, upon determining that the ONU is already registered to the PON of the OLT.

16. The method of claim 10, wherein the first supported upstream line rate is 2.5 G and the second supported upstream line rate is 10 G.

17. The method of claim 10, wherein the first supported upstream line rate is 1.25 G and the second supported upstream line rate is 2.5 G.

18. The method of claim 10, further comprising:
associating with a passive optical network (PON) of the OLT after transmitting the first serial number response; and
privately communicating, by the ONU with the OLT, after associating with the PON.

19. An optical line terminal (OLT) comprising:
a processor; and
a non-transitory computer readable storage medium storing programming for execution by the processor, the programming including instructions to:
  broadcast, to a plurality of optical network units (ONUs), a first downstream (DS) physical layer (PHY) frame comprising:
    a first start time for a first quiet window; and
    a first allocation identifier (Alloc-ID), wherein the first Alloc-ID indicates that ONUs of a first group of ONUs transmitting at a first supported upstream line rate may use the first quiet window and that ONUs of a second group of ONUs not transmitting at the first supported upstream line rate may not use the first quiet window, and wherein the ONUs of the second group of ONUs configured to transmit at a second supported upstream line rate;
  opening the first quiet window at the first start time; and
  receiving, from a first ONU of the first group of ONUs, during the first quiet window, a serial number response.

20. An optical network unit (ONU) comprising:
a processor; and
a non-transitory computer readable storage medium storing programming for execution by the processor, the programming including instructions to:
  receive, from an optical line terminal (OLT), a first downstream (DS) physical layer (PHY) frame comprising:
    a first start time for a first quiet window; and
    a first allocation identifier (Alloc-ID), wherein the first Alloc-ID indicates that ONUs of a first group of ONUs transmitting at a first supported upstream line rate may use the first quiet window and that ONUs of a second group of ONUs not transmitting at the first supported upstream line rate may not use the first quiet window, and wherein the ONUs of the second group of ONUs configured to transmit at a second supported upstream line rate;
  determine whether an upstream line rate of the ONU is the same as the first supported upstream line rate;
  transmit, to the OLT, during the first quiet window, a serial number response upon determining that the upstream line rate of the ONU is the same as the first supported upstream line rate; and
  refrain from transmitting, to the OLT, during the first quiet window, upon determining that the upstream line rate of the ONU is different than the first supported upstream line rate.

* * * * *